(12) United States Patent
Liu et al.

(10) Patent No.: US 10,912,036 B2
(45) Date of Patent: Feb. 2, 2021

(54) DOWNLINK TRANSMISSION METHOD, BASE STATION, AND TERMINAL DEVICE

(71) Applicant: Huawei Technologies Co., Ltd., Shenzhen (CN)

(72) Inventors: Yifan Liu, Shenzhen (CN); Ming Lei, Shenzhen (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/446,094

(22) Filed: Jun. 19, 2019

(65) Prior Publication Data

US 2019/0306802 A1    Oct. 3, 2019

Related U.S. Application Data

(63) Continuation of application No. PCT/CN2017/115781, filed on Dec. 13, 2017.

(30) Foreign Application Priority Data

Dec. 22, 2016    (CN) .......................... 2016 1 1196919

(51) Int. Cl.
*H04W 52/14* (2009.01)
*H04W 72/04* (2009.01)
(Continued)

(52) U.S. Cl.
CPC .......... *H04W 52/14* (2013.01); *H04L 5/0005* (2013.01); *H04W 52/143* (2013.01);
(Continued)

(58) Field of Classification Search
CPC ... H04W 52/14; H04W 52/143; H04W 52/24; H04W 52/243; H04W 52/265;
(Continued)

(56) References Cited

U.S. PATENT DOCUMENTS 6,650,655 B2 * 11/2003 Alvesalo ............... H04W 16/14
370/468
7,715,485 B1 * 5/2010 Schlegel .............. H04B 7/0413
375/260
(Continued)

FOREIGN PATENT DOCUMENTS

CN    1953349 A    4/2007
CN    102349337 A    2/2012
(Continued)

OTHER PUBLICATIONS

CMCC, "Discussion on HARQ transmission for LAA," 3GPP TSG RAN WG1 Ad-hoc Meeting, R1-150993, Paris, France, Mar. 24-26, 2015, 4 pages.
(Continued)

*Primary Examiner* — Dominic E Rego
(74) *Attorney, Agent, or Firm* — Slater Matsil, LLP (57) ABSTRACT

Embodiments of this application provide a downlink transmission method, a base station, and a terminal device. The method includes: dividing, by a base station, to-be-transmitted data into at least two sets, and configuring a transmit power for each of the at least two sets; and sending, by the base station, data in each set to a terminal device at the transmit power configured for each set. In the embodiments of this application, the to-be-transmitted data is divided into the at least two sets, a transmit power is configured individually for each set, and the data in each set is sent to the terminal device at the transmit power configured for each set.

16 Claims, 7 Drawing Sheets

(51) Int. Cl.
*H04L 5/00* (2006.01)
*H04W 52/24* (2009.01)
*H04W 52/36* (2009.01)
*H04W 72/08* (2009.01)
*H04W 52/32* (2009.01)

(52) U.S. Cl.
CPC ......... *H04W 52/24* (2013.01); *H04W 52/243* (2013.01); *H04W 52/365* (2013.01); *H04W 72/0446* (2013.01); *H04L 5/0092* (2013.01); *H04W 52/325* (2013.01); *H04W 72/042* (2013.01); *H04W 72/0493* (2013.01); *H04W 72/082* (2013.01)

(58) Field of Classification Search
CPC ........... H04W 72/0446; H04W 52/325; H04W 72/042; H04W 72/0493; H04W 72/082; H04L 5/0005; H04L 5/0092
See application file for complete search history.

(56) References Cited

U.S. PATENT DOCUMENTS

| | | | | |
|---|---|---|---|---|
| 9,578,539 | B1* | 2/2017 | Park | H04W 52/267 |
| 9,967,609 | B2* | 5/2018 | Lee | H04W 72/1231 |
| 2005/0259627 | A1* | 11/2005 | Song | H04B 7/0862 370/342 |
| 2008/0214230 | A1* | 9/2008 | Shinozaki | H04W 52/12 455/522 |
| 2008/0259068 | A1* | 10/2008 | Liu | G09G 3/3655 345/211 |
| 2010/0150000 | A1* | 6/2010 | Sakata | H04L 5/0023 370/252 |
| 2012/0002580 | A1 | 1/2012 | Nakashima et al. | |
| 2012/0213123 | A1* | 8/2012 | Futaki | H04L 5/001 370/254 |
| 2013/0028214 | A1* | 1/2013 | Imamura | H04W 52/346 370/329 |
| 2013/0260787 | A1* | 10/2013 | Hashimoto | H04W 64/00 455/456.1 |
| 2014/0254537 | A1* | 9/2014 | Kim | H04J 11/0053 370/329 |
| 2014/0321345 | A1* | 10/2014 | Li | H04W 52/54 370/311 |
| 2014/0341093 | A1 | 11/2014 | Seo | |
| 2015/0201382 | A1* | 7/2015 | Wang | H04W 52/248 370/311 |
| 2015/0257164 | A1* | 9/2015 | Lim | H04L 43/04 370/252 |
| 2016/0014778 | A1* | 1/2016 | Zhou | H04L 5/0053 370/252 |
| 2016/0105265 | A1* | 4/2016 | Wang | H04L 5/0053 370/252 |
| 2016/0183199 | A1* | 6/2016 | Takeda | H04J 11/004 370/329 |
| 2017/0078973 | A1* | 3/2017 | Ohwatari | H04W 52/325 |
| 2017/0093663 | A1* | 3/2017 | Douglas | H04L 41/12 |
| 2017/0195892 | A1* | 7/2017 | Tonnemacher | H04W 24/04 |
| 2018/0026481 | A1* | 1/2018 | Ku | H04B 5/0037 370/329 |
| 2018/0092089 | A1* | 3/2018 | Yin | H04W 72/0406 |
| 2018/0160379 | A1* | 6/2018 | Yokomakura | H04L 5/00 |
| 2019/0223096 | A1* | 7/2019 | Zhang | H04W 36/0072 |

FOREIGN PATENT DOCUMENTS

| | | |
|---|---|---|
| CN | 102427608 A | 4/2012 |
| CN | 103369657 A | 10/2013 |
| CN | 103874181 A | 6/2014 |
| CN | 104025673 A | 9/2014 |
| WO | 2011020217 A1 | 2/2011 |
| WO | 2016043339 A1 | 3/2016 |

OTHER PUBLICATIONS

Zte, et al., "Discussion on duplex and interference management," 3GPP TSG RAN WG1 Meeting #87, R1-1612156, Reno, USA, Nov. 14-18, 2016, 10 pages.

Ericsson, "DL power control for LAA," 3GPP TSG RAN WG1 Meeting #82bis, R1-156042, Malmo, Sweden, Oct. 5-9, 2015, 3 pages.

NEC, "eRNTP Signalling for Inter-eNB COMP," 3GPP TSG-RAN WG3 Meeting #88, R3-150993, Fukuoka, Japan, May 25-29, 2015, 6 pages.

Ericsson, "NAICS parameters," 3GPP TSG-RAN WG2 #87, Tdoc R2-143509, Dresden, Germany, Aug. 18-22, 2014, 5 pages.

* cited by examiner

DOWNLINK TRANSMISSION METHOD, BASE STATION, AND TERMINAL DEVICE

CROSS-REFERENCE TO RELATED APPLICATIONS

This application is a continuation of International Application No. PCT/CN2017/115781, filed on Dec. 13, 2017, which claims priority to Chinese Patent Application No. 201611196919.8, filed on Dec. 22, 2016. The disclosures of the aforementioned applications are hereby incorporated by reference herein in their entireties.

TECHNICAL FIELD

Embodiments of this application relate to the communications field, and in particular, to a downlink transmission method, a base station, and a terminal device.

BACKGROUND

Figure 1:
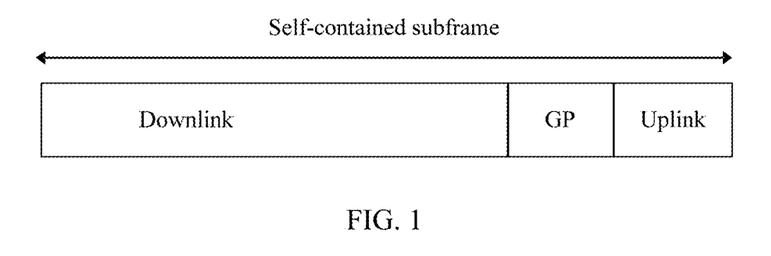
FIG. 1 is a schematic structural diagram of a self-contained subframe.
Figure 2:
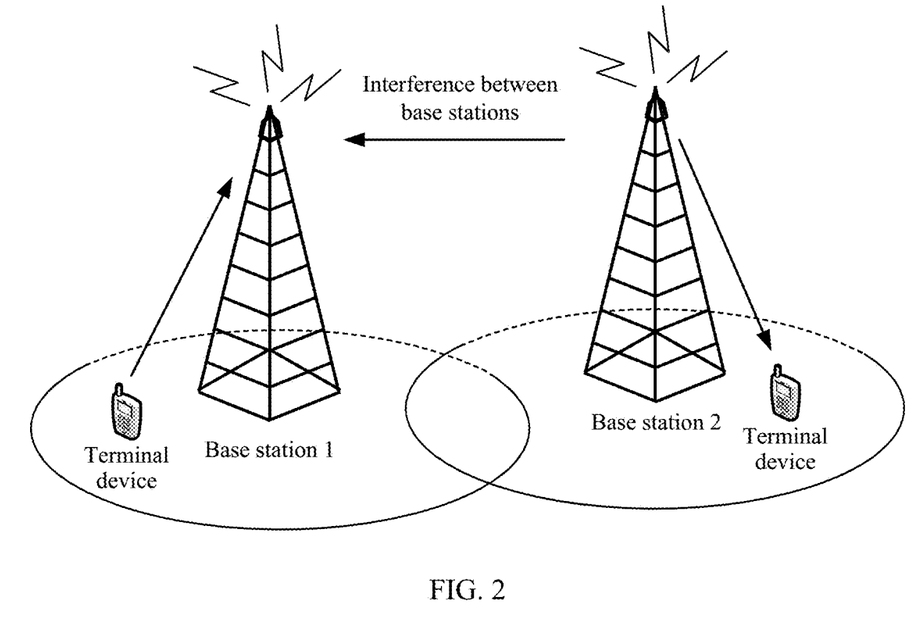
FIG. 2 is a schematic diagram of interference between base stations.

Self-contained subframes are introduced to the 5th Generation New Radio (5G NR) in addition to existing uplink subframes and downlink subframes. A structure of a self-contained subframe is shown in FIG. 1. The self-contained subframe includes time domain resources for downlink transmission and uplink transmission, and a guard period (GP). In an application scenario shown in FIG. 2, a base station 1 uses a self-contained subframe for downlink transmission, and a base station 2 uses a downlink subframe for downlink transmission. As the tail of the self-contained subframe is used for uplink transmission, if the base station 2 is using the downlink subframe for downlink transmission when the base station 1 is receiving data sent by a terminal device through uplink transmission, the base station 1 is subject to downlink interference from the base station 2.

In the current system, base station configuration is not flexible enough to support downlink transmission configuration to reduce interference between base stations.

SUMMARY

Embodiments of this application provide a downlink transmission method, a base station, and a terminal, so that flexibility of base station configuration can be improved.

According to a first aspect, a downlink transmission method is provided, including:

dividing, by a base station, to-be-transmitted data into at least two sets, and configuring a transmit power for each of the at least two sets; and sending, by the base station, data in each set to a terminal device at the transmit power configured for each set.

In this embodiment of this application, the to-be-transmitted data is divided into the at least two sets, a transmit power is configured individually for each set, and the data in each set is sent to the terminal device at the transmit power configured for each set. In this way, flexibility of base station configuration can be improved.

In addition, a relatively low transmit power is configured for downlink transmission data that may cause interference to a base station in a neighboring cell, and interference to the base station in the neighboring cell can thereby be reduced. Therefore, this embodiment of this application helps reduce interference between base stations.

In some possible implementations, before the sending, by the base station, data in each set to the terminal device at a transmit power configured for each set, the method further includes:

sending, by the base station, indication information to the terminal device, where the indication information indicates the at least two sets and power information of each of the at least two sets, where the power information of each set indicates the transmit power configured for each set.

In some possible implementations, the power information of each set is a difference between the transmit power for each set and a preset power or a ratio of the transmit power for each set to a preset power.

In some possible implementations, the dividing, by a base station, to-be-transmitted data into at least two sets includes:

determining, by the base station, that a self-contained subframe is used for transmission in a neighboring cell; and dividing, by the base station, the to-be-transmitted data into the at least two sets, where at least one of the at least two sets is transmitted by using a time domain resource, in the self-contained subframe, used for uplink transmission in the neighboring cell, and a set of the at least two sets other than the at least one set is transmitted by using a time domain resource, in the self-contained subframe, used for downlink transmission in the neighboring cell.

In this embodiment of this application, when determining that the self-contained subframe is used for transmission in the neighboring cell, the base station divides the to-be-transmitted data into the at least two sets based on a structure of the self-contained subframe, and configures a transmit power individually for each of the at least two sets. This enables flexible adjustment of a transmit power used when data is transmitted on different time domain resources of the self-contained subframe.

Optionally, a transmit power configured for the at least one of the at least two sets is less than a transmit power configured for a set of the at least two sets other than the at least one set.

This can reduce interference to the base station in the neighboring cell from data sent by the base station on the time domain resource used for uplink transmission in the neighboring cell.

In some possible implementations, before the sending, by the base station, data in each set to the terminal device at a transmit power configured for each set, the method further includes:

sending, by the base station, subframe configuration information of the neighboring cell to the terminal device, where the subframe configuration information indicates that a self-contained subframe is used for transmission in the neighboring cell.

In some possible implementations, the at least two sets include a first set and a second set, where the first set and a reference signal occupy a same time-frequency resource, and the second set and the reference signal occupy different time-frequency resources; and the sending, by the base station, data in each set to a terminal device at the transmit power configured for each set includes:

in a spatial multiplexing manner on a time-frequency resource corresponding to a pattern of the reference signal, sending, by the base station, the reference signal to the terminal device through a first logical port, and sending data in the first set to the terminal device through a second logical port at a transmit power configured for the first set; and sending, by the base station, data in the second set to the terminal device at a transmit power configured for the second set.

In this embodiment of this application, a reference signal and data are sent in a spatial multiplexing manner. In this way, data can also be transmitted on a time-frequency resource used for reference signal transmission, and data transmission efficiency can be improved.

According to a second aspect, a downlink transmission method is provided, including:

determining, by a terminal device, to-be-transmitted data has been divided into at least two sets by a base station and power information of each of the at least two sets; and receiving, by the terminal device, data in each set from the base station based on the power information of each set, where the power information of each set indicates a transmit power configured for each set.

In this embodiment of this application, the terminal device can receive the data in each set based on the power information of each set.

In some possible implementations, the determining, by a terminal device, at least two sets obtained through division of to-be-transmitted data by a base station and power information of each of the at least two sets includes:

receiving, by the terminal device, indication information from the base station, where the indication information indicates the at least two sets and the power information of each of the at least two sets; and determining, by the terminal device, the at least two sets and the power information of each set based on the indication information.

In some possible implementations, the power information of each set is a difference between the transmit power for each set and a preset power or a ratio of the transmit power for each set to a preset power.

In some possible implementations, the determining, by a terminal device, at least two sets obtained through division of to-be-transmitted data by a base station and power information of each of the at least two sets includes:

receiving, by the terminal device, subframe configuration information of a neighboring cell from the base station, where the subframe configuration information indicates that a self-contained subframe is used for transmission in the neighboring cell; and based on the subframe configuration information, determining, by the terminal device, the at least two sets obtained through division of the to-be-transmitted data by the base station and the power information of each set, where at least one of the at least two sets is transmitted by using a time domain resource, in the self-contained subframe, used for uplink transmission in the neighboring cell, and a set of the at least two sets other than the at least one set is transmitted by using a time domain resource, in the self-contained subframe, used for downlink transmission in the neighboring cell.

In some possible implementations, the at least two sets include a first set and a second set, where the first set and a reference signal occupy a same time-frequency resource, and the second set and the reference signal occupy different time-frequency resources; and the receiving, by the terminal device, data in each set from the base station based on the power information of each set includes:

obtaining, by the terminal device, a pattern of the reference signal;

receiving, by the terminal device, the reference signal on a time-frequency resource corresponding to the pattern of the reference signal through a first logical port, and receiving data in the first set based on power information of the first set through a second logical port; and receiving, by the terminal device, data in the second set based on power information of the second set.

In this embodiment of this application, a reference signal and data are sent in a spatial multiplexing manner. In this way, data can also be transmitted on a time-frequency resource used for reference signal transmission, and data transmission efficiency can be improved.

According to a third aspect, a base station is provided, and the base station is configured to implement the method in any one of the first aspect and the possible implementations of the first aspect.

Specifically, the base station may include units configured to execute the method in any one of the first aspect and the possible implementations of the first aspect.

According to a fourth aspect, a terminal device is provided, and the terminal device is configured to implement the method in any one of the second aspect and the possible implementations of the second aspect.

Specifically, the terminal device may include units configured to execute the method in any one of the second aspect and the possible implementations of the second aspect.

According to a fifth aspect, a base station is provided, including a processor, a transmitter, and a memory, where the processor, the transmitter, and the memory communicate with each other by using an internal connection path. The memory is configured to store an instruction, the processor is configured to execute the instruction stored in the memory, and the execution of the instruction stored in the memory causes the base station to perform the method in any one of the first aspect and the possible implementations of the first aspect.

According to a sixth aspect, a terminal device is provided, including a processor, a receiver, a memory, and a bus system, where the processor, the receiver, and the memory communicate with each other through internal connection paths. The memory is configured to store an instruction, the processor is configured to execute the instruction stored in the memory, and the execution of the instruction stored in the memory causes the terminal device to perform the method in any one of the second aspect and the possible implementations of the second aspect.

According to a seventh aspect, a computer readable storage medium is provided, where the computer readable storage medium stores a program, and the program causes a base station to perform the method in any one of the first aspect and the possible implementations of the first aspect.

According to an eighth aspect, a computer readable storage medium is provided, where the computer readable storage medium stores a program, and the program causes a terminal device to perform the method in any one of the second aspect and the possible implementations of the second aspect.

DETAILED DESCRIPTION OF ILLUSTRATIVE EMBODIMENTS

The following describes technical solutions in the embodiments of this application with reference to the accompanying drawings in the embodiments of this application.

It should be understood that the technical solutions in the embodiments of this application may be applied to various communications systems, for example, a Wireless Fidelity (Wi-Fi) system, a Worldwide Interoperability for Microwave Access (WiMAX) system, a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, a Long Term Evolution Advanced (LTE-A) system, a Universal Mobile Telecommunications System (UMTS), and cellular systems related to the 3rd Generation Partnership Project (3GPP). This is not limited in the embodiments of this application. For ease of description, an LTE network is used as an example for description in the embodiments of this application.

The embodiments of this application may be used in radio networks of different standards. A radio access network may include different network elements in different systems. For example, network elements of a radio access network in a 5G network include a gNB, network elements of a radio access network in Long Term Evolution (LTE) or LTE-A include an eNodeB (eNB), and network elements of a radio access network in Wideband Code Division Multiple Access (WCDMA) include a radio network controller (RNC) and a NodeB. Similarly, in other wireless networks such as a Worldwide Interoperability for Microwave Access (WiMax) network, a solution similar to that in the embodiments of this application may also be used, with only differences in related modules in a base station system. This is not limited in the embodiments of this application. However, for ease of description, a base station is used as an example for description in the embodiments of this application.

It should also be understood that, in the embodiments of this application, a terminal device may also be referred to as user equipment (UE), a mobile station (MS), a mobile terminal, and the like. The terminal device may communicate with one or more core networks through a radio access network (RAN). For example, the terminal device may be a mobile phone (or referred to as a "cellular" phone), or a computer having a communication function. For example, the terminal device may alternatively be a portable, pocket-sized, handheld, computer built-in, or in-vehicle mobile apparatus.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

"First" and "second" in the embodiments of this application are merely used for differentiation and do not indicate a sequence or sizes.

An embodiment of this application provides a reference signal transmission method. In the method, a base station may send a reference signal and data to a terminal device in a spatial multiplexing manner on a time-frequency resource corresponding to a pattern of the reference signal. In this way, a time-frequency resource used for reference signal transmission can also be used for data transmission, so that data transmission efficiency can be improved.

Figure 3:
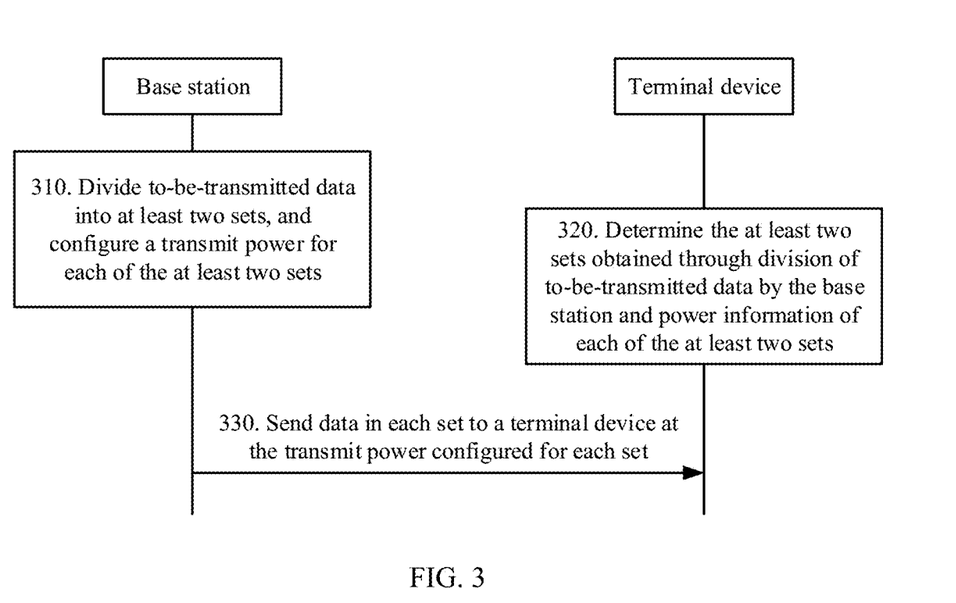
FIG. 3 is a schematic flowchart of a downlink transmission method according to an embodiment of this application.

FIG. 3 is a schematic flowchart of a downlink transmission method 300 according to an embodiment of this application. As shown in FIG. 3, the method 300 includes the following content.

310. A base station divides to-be-transmitted data into at least two sets, and configures a transmit power for each of the at least two sets.

320. A terminal device determines the at least two sets obtained through division of the to-be-transmitted data by the base station, and determines power information of each of the at least two sets.

The power information of each set indicates the transmit power configured for each set. For example, the power information of each set may be the transmit power configured for each set. Alternatively, the power information of each set may be a relative value of the transmit power configured for each set to a preset power.

Optionally, the power information of each set may be a difference between the transmit power for each set and a preset power or a ratio of the transmit power for each set to a preset power. The preset power may be pre-agreed by the base station and the terminal device, or may be protocol-specified. For example, the preset power may be a protocol-specified power for a demodulation reference signal (DMRS).

330. The base station sends data in each set to the terminal device at a transmit power configured for each set. Specifically, the base station sends the data in each set to the terminal device by using the transmit power configured for each set.

Correspondingly, the terminal device receives the data in each set from the base station based on the power information of each set.

In this embodiment of this application, the to-be-transmitted data is divided into the at least two sets, a transmit power is configured individually for each set, and the data in each set is sent to the terminal device at the transmit power configured for each set. In this way, flexibility of base station configuration can be improved.

For example, the base station configures a relatively low transmit power for downlink transmission data that may cause interference to a base station in a neighboring cell, and interference to the base station in the neighboring cell can thereby be reduced. Therefore, this embodiment of this application helps reduce interference between base stations.

In step 320, the terminal device may use a plurality of methods, to determine the at least two sets obtained through division of the to-be-transmitted data by the base station and the power information of each of the at least two sets. This is not limited in this embodiment of this application.

For example, in step 320, that a terminal device determines the at least two sets obtained through division of the to-be-transmitted data by the base station, and determines power information of each of the at least two sets includes, that the terminal device receives indication information from the base station, where the indication information indicates the at least two sets and the power information of each of the at least two sets. The indication information may be carried in higher layer signaling, media access control (MAC) layer signaling, or physical layer signaling. This is not limited in this embodiment of this application.

For example, a rule for division into the at least two sets, and the indication information of the power information of each of the at least two sets may be pre-stored in the terminal device. In step 320, the terminal device may determine the at least two sets based on the pre-stored division rule, and determine the power information of each set according to the pre-stored indication information.

Figure 4:
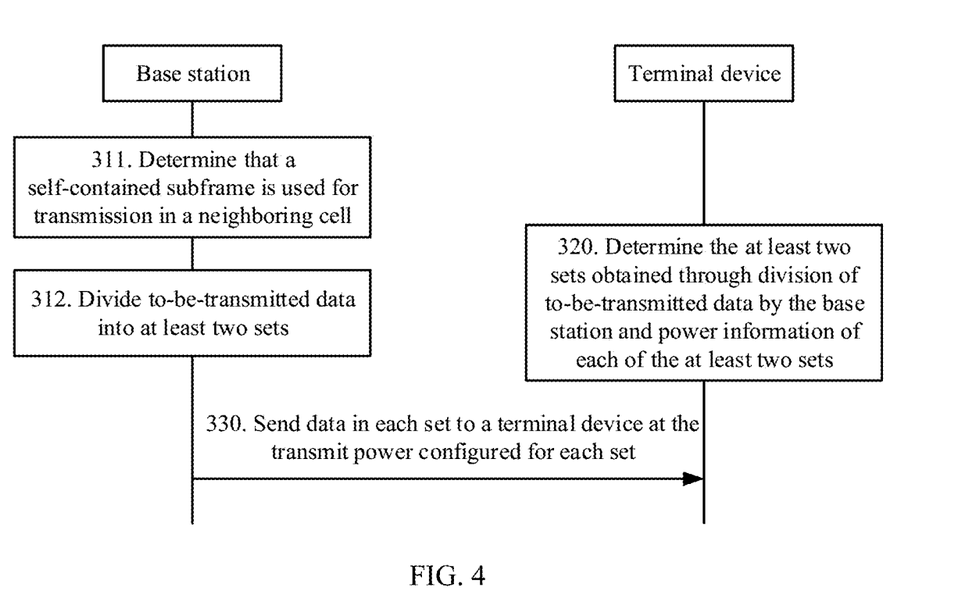
FIG. 4 is a schematic flowchart of a downlink transmission method according to another embodiment of this application.

FIG. 4 shows another embodiment of the method 300 shown in FIG. 3. As shown in FIG. 4, in step 310, that a base station divides to-be-transmitted data into at least two sets includes the following steps:

311. The base station determines that a self-contained subframe is used for transmission in a neighboring cell.

312. The base station divides the to-be-transmitted data into the at least two sets, where at least one of the at least two sets is transmitted by using a time domain resource, in the self-contained subframe, used for uplink transmission in the neighboring cell, and a set of the at least two sets other than the at least one set is transmitted by using a time domain resource, in the self-contained subframe, used for downlink transmission in the neighboring cell.

It should be understood that, in this embodiment of this application, the neighboring cell is a cell that can receive interference from the base station.

In other words, when determining that the self-contained subframe is used for transmission in the neighboring cell, the base station divides the to-be-transmitted data into the at least two sets based on a structure of the self-contained subframe, and configures a transmit power individually for each of the at least two sets. This enables flexible adjustment of a transmit power used when data is transmitted on different time domain resources of the self-contained subframe.

For example, a relatively low transmit power is configured for a set mapped to a time domain resource used for uplink transmission in the self-contained subframe, and interference to signal reception of a base station in a neighboring cell can thereby be reduced.

In other words, if the base station in the neighboring cell is receiving uplink data when the base station is sending downlink data, a transmit signal of the base station interferes with a receive signal of the base station in the neighboring cell. In this case, the base station may configure a relatively low power value for a transmit power for the sent data, to reduce interference to the base station in the neighboring cell. If the base station in the neighboring cell is also sending downlink data when the base station is sending downlink data, the base station does not interfere with the base station in the neighboring cell. In this case, the base station may configure a normal or a relatively high power value for a transmit power for the sent data, to help detection of the terminal device. Therefore, in this embodiment of this application, the to-be-transmitted data is divided into the at least two sets with a transmit power configured individually for each of the at least two sets. This enables flexible transmit power configuration for the to-be-transmitted data, and interference between the base stations is reduced.

Optionally, before step 330, the method 300 further includes:

sending, by the base station, subframe configuration information of the neighboring cell to the terminal device, where the subframe configuration information indicates that a self-contained subframe is used for transmission in the neighboring cell.

Correspondingly, after receiving the subframe configuration information of the neighboring cell from the base station, the terminal device may determine, based on the subframe configuration information, the at least two sets obtained through division of the to-be-transmitted data by the base station, and determine the power information of each of the at least two sets, where at least one of the at least two sets is transmitted by using a time domain resource, in the self-contained subframe, used for uplink transmission in the neighboring cell, and a set of the at least two sets other than the at least one set is transmitted by using a time domain resource, in the self-contained subframe, used for downlink transmission in the neighboring cell.

For example, a set division rule for the to-be-transmitted data and the power information of each set are pre-agreed by the terminal device and the base station, or protocol-specified, or pre-stored in the terminal device. Therefore, when determining that the self-contained subframe is used for transmission in the neighboring cell, the terminal device may determine, based on the division rule, the at least two sets obtained through division of the to-be-transmitted data by the base station, and determine the power information of each of the at least two sets.

Figure 5:
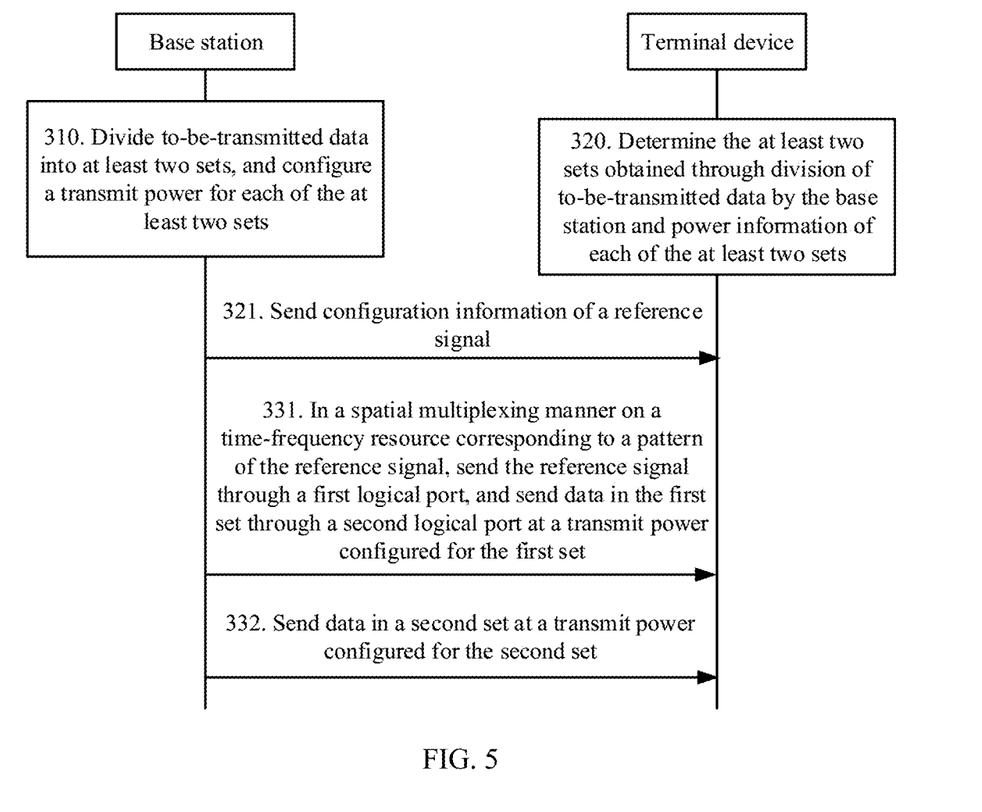
FIG. 5 is a schematic flowchart of a downlink transmission method according to another embodiment of this application.

FIG. 5 shows another embodiment of the method 300 shown in FIG. 3. In this embodiment of this application, the at least two sets include a first set and a second set, where the first set and a reference signal occupy a same time-frequency resource, and the second set and the reference signal occupy different time-frequency resources. Data in the first set and the reference signal may be sent in a spatial multiplexing manner.

In other words, in step 310, the base station may divide the to-be-transmitted data into the at least two sets based on time-frequency resources occupied by the to-be-transmitted data.

In this embodiment of this application, the terminal device may further obtain a pattern of the reference signal. How the terminal device obtains the pattern of the reference signal is not limited in this embodiment of this application.

As shown in FIG. 5, the method 100 may further include:

321. The base station sends configuration information of the reference signal to the terminal device, where the configuration information of the reference signal includes the pattern of the reference signal.

In other words, the terminal device may receive the pattern of the reference signal from the base station. Alternatively, the pattern of the reference signal may be pre-stored in the terminal device.

Optionally, the configuration information of the reference signal may further include a sequence of the reference signal.

The configuration information of the reference signal may be sent to the terminal device by using higher layer signaling.

Correspondingly, in step 330, that the base station sends data in the at least two sets to the terminal device at the transmit powers configured for each set includes the following steps:

331. In a spatial multiplexing manner on a time-frequency resource corresponding to the pattern of the reference signal, the base station sends the reference signal to the terminal device through a first logical port, and sends data in the first set to the terminal device through a second logical port at a transmit power configured for the first set.

332. The base station sends data in the second set to the terminal device at a transmit power configured for the second set.

It should be noted that the base station may further configure a transmit power for the reference signal. Correspondingly, the base station may send the reference signal based on the configured transmit power through the first logical port.

Figure 6:
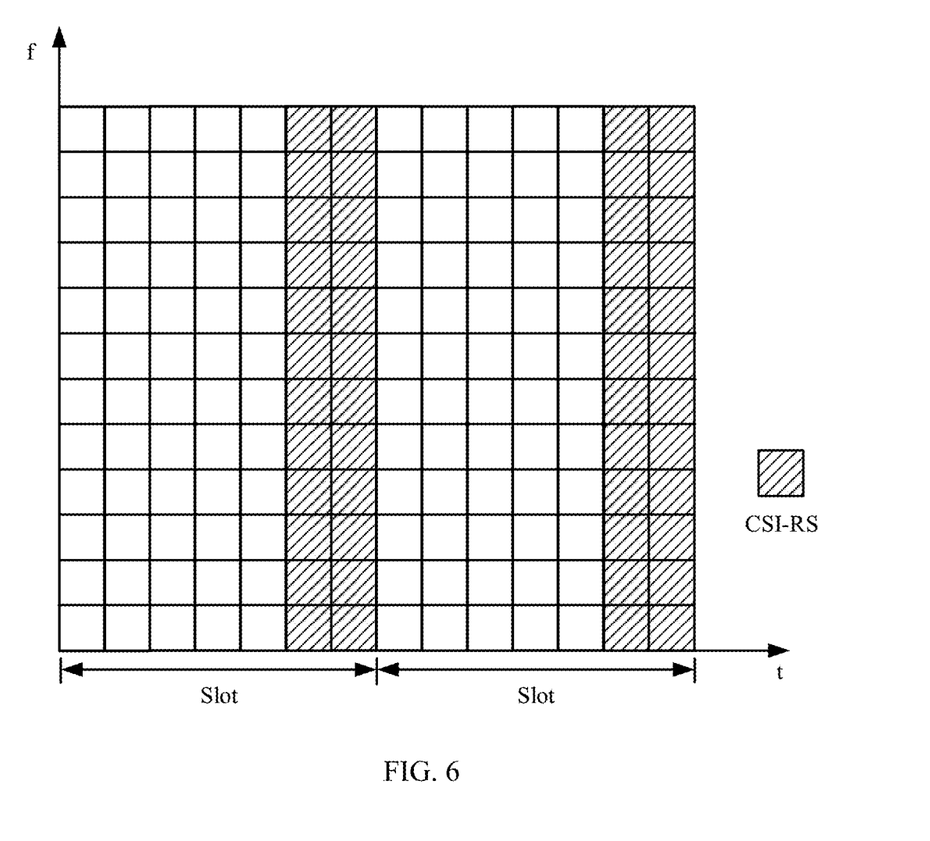
FIG. 6 is a schematic diagram of a pattern of a CSI-RS.
Figure 7:
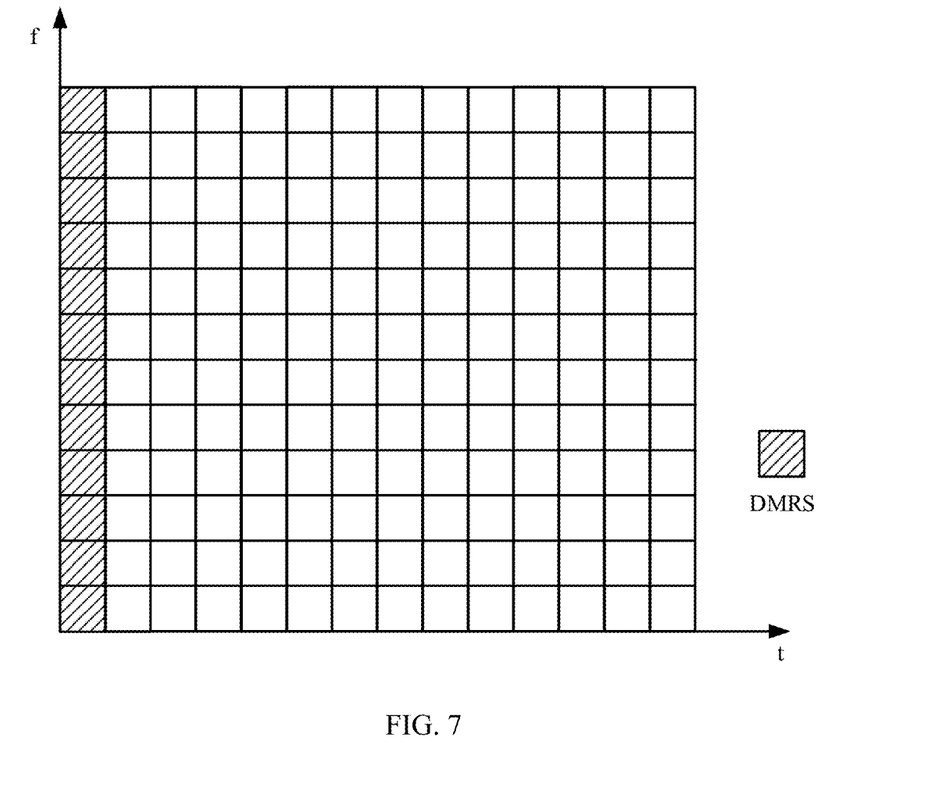
FIG. 7 is a schematic diagram of a pattern of a DMRS.

The reference signal may be used to measure a channel state or channel quality, and may be further used to measure interference between a plurality of users. For example, the reference signal may be a channel state information reference signal (CSI-RS) or a demodulation reference signal (DMRS). It should be noted that patterns of the CSI-RS and CSI-RS may be different. As shown in FIG. 6, in a slot, the CSI-RS may occupy two orthogonal frequency division multiplexing (OFDM) symbols. As shown in FIG. 7, the DMRS may occupy the first OFDM symbol in a resource block, the first OFDM symbol and the second OFDM symbol in the resource block may be used to transmit control channels, and the DMRS may be carried in a control channel transmitted in the first OFDM symbol. It should be noted that FIG. 6 and FIG. 7 are merely examples. Patterns of the CSI-RS and DMRS are not limited in this embodiment of this application.

Correspondingly, after receiving the configuration information of the reference signal sent by the base station, the terminal device may determine the pattern of the reference signal. Then, on the time-frequency resource corresponding to the pattern of the reference signal, the terminal device receives the reference signal through the first logical port, and receives the data in the first set through the second logical port.

The first logical port and the second logical port may correspond to different transport layers. It should be noted that the first logical port may be one or more logical ports, and that the second logical port may be one or more logical ports.

It should be noted that the base station may send a reference signal and data to one or more terminal devices in a spatial multiplexing manner. In other words, a reference signal and data that are sent in a spatial multiplexing manner may be sent together to one terminal device, or may be sent together to a plurality of terminal devices, or may be sent separately to different terminal devices.

In the current system, when sending data, a base station sends, to a terminal device, indication information such as a location of a time-frequency resource used for reference signal transmission, and when performing resource mapping for data, the base station avoids the location of the time-frequency resource occupied by a reference signal. When receiving data, the terminal device may also avoid the location of the time-frequency resource occupied by a reference signal based on the indication from the base station. In other words, when some time-frequency resources in the resource block are used to send a reference signal, time-frequency resources containing the reference signal are punctured. As a result, the time-frequency resources occupied by the reference signal are unable to transmit data.

In this embodiment of this application, a reference signal and data are sent in a spatial multiplexing manner. In this way, data can also be transmitted on a time-frequency resource used for reference signal transmission, and data transmission efficiency can be improved.

In this embodiment of this application, when a predefined condition is met, the base station may determine to send a reference signal and data to the terminal device in a spatial multiplexing manner.

For example, when a quantity of to-be-transmitted reference signals is relatively small, the base station may determine to send the reference signals and data to the terminal device in a spatial multiplexing manner. For example, when the quantity of to-be-transmitted reference signals is less than or equal to a preset threshold, the base station determines to send the reference signals and data to the terminal device in a spatial multiplexing manner on the time-frequency resource used for reference signal transmission.

It should also be understood that, in this embodiment of this application, the terminal device may receive the signals on the time-frequency resource corresponding to the pattern of the reference signal through at least one logical port.

Optionally, the terminal device may further obtain power information of the reference signal.

In this embodiment of this application, the power information of the reference signal indicates power for the reference signal. For example, the power information of the reference signal may be the power for the reference signal. Alternatively, the power information of the reference signal may be a relative value of the power for the reference signal to another power.

Optionally, the power information of the reference signal may be a difference between the transmit power for each set and a preset power or a ratio of the transmit power for each set to a preset power. The preset power may be pre-agreed by the base station and the terminal device, or may be protocol-specified. For example, the preset power may be a protocol-specified power for a DMRS.

In some embodiments, the terminal device may obtain a correspondence between logical ports and a reference signal and data that are sent by the base station in a spatial multiplexing manner. For example, the terminal device may receive, from the base station, indication information used to indicate the correspondence, and determine the correspondence based on the indication information.

It should be noted that, in this embodiment of this application, if the terminal device cannot learn in advance the correspondence between logical ports and a reference signal and data that are sent by the base station in a spatial multiplexing manner, the terminal device may receive signals through different logical ports, and then perform power detection on the received signal, and determine, based on power information of data and/or a reference signal, whether the received signal is a reference signal or a data signal.

In other words, the base station indicates to the terminal device the power information of the reference signal and/or the data that are/is sent in a spatial multiplexing manner, so that the terminal device can determine, based on the power information and a power detection result, the correspondence between logical ports and a reference signal and data. Then, the terminal device may demodulate the reference signal and the data separately.

It should be noted that the base station and the terminal device may also pre-agree the correspondence between logical ports and a reference signal and data. Alternatively, the terminal device may pre-configure the correspondence, so that the terminal device can receive a reference signal and data through corresponding logical ports according to the correspondence. Alternatively, the base station may configure the correspondence between logical ports and a reference signal and data, and indicate the correspondence to the terminal device. The correspondence between logical ports and a reference signal and data that are sent in a spatial multiplexing manner is directly indicated to the terminal device, so that the terminal device does not need to determine, based on a power detection result, the correspondence between logical ports and a reference signal and data.

It should be understood that, in the embodiments of this application, the sequence numbers of the foregoing processes do not mean execution orders. The execution orders of the processes should be determined based on functions and internal logic of the processes, and should not be construed as any limitation on the implementation processes of the embodiments of this application.

The following describes a base station and a terminal device in the embodiments of this application with reference to FIG. 8 to FIG. 11.

Figure 8:
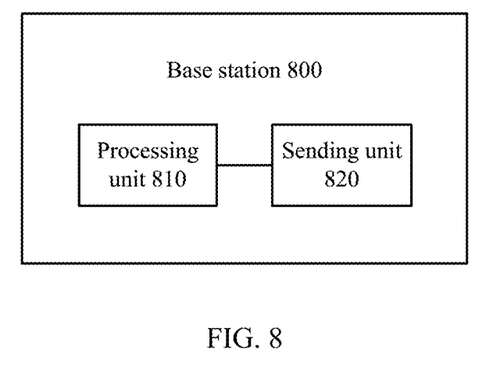
FIG. 8 is a schematic structural diagram of a base station according to an embodiment of this application.

FIG. 8 is a schematic structural diagram of a base station 800 according to an embodiment of this application. As shown in FIG. 8, the base station 800 includes a processing unit 810 and a sending unit 820.

The processing unit 810 is configured to divide to-be-transmitted data into at least two sets, and configure a transmit power for each of the at least two sets.

The sending unit 820 is configured to send data in each set to a terminal device at the transmit power configured for each set by the processing unit.

In this embodiment of this application, the to-be-transmitted data is divided into the at least two sets, a transmit power is configured individually for each set, and the data in each set is sent to the terminal device at the transmit power configured for each set. In this way, flexibility of base station configuration can be improved.

Optionally, before sending the data in each set to a terminal device at the transmit power configured for each set by the processing unit 810, the sending unit 820 is further configured to send indication information to the terminal device, where the indication information indicates the at least two sets and power information of each of the at least two sets.

Optionally, the power information of each set is a difference between the transmit power for each set and a preset power or a ratio of the transmit power for each set to a preset power.

In some embodiments, the processing unit 810 is specifically configured to:

determine that a self-contained subframe is used for transmission in a neighboring cell; and divide the to-be-transmitted data into the at least two sets, where at least one of the at least two sets is transmitted by using a time domain resource, in the self-contained subframe, used for uplink transmission in the neighboring cell, and a set of the at least two sets other than the at least one set is transmitted by using a time domain resource, in the self-contained subframe, used for downlink transmission in the neighboring cell.

Optionally, before sending the data in the at least two sets to the terminal device at the transmit powers configured for each set, the sending unit 820 is further configured to send subframe configuration information of the neighboring cell to the terminal device, where the subframe configuration information indicates that a self-contained subframe is used for transmission in the neighboring cell.

In some embodiments, the at least two sets include a first set and a second set, where the first set and a reference signal occupy a same time-frequency resource, and the second set and the reference signal occupy different time-frequency resources. Correspondingly, the sending unit 820 is specifically configured to:

in a spatial multiplexing manner on a time-frequency resource corresponding to a pattern of the reference signal, send the reference signal to the terminal device through a first logical port, and send data in the first set to the terminal device through a second logical port at a transmit power configured for the first set; and send data in the second set to the terminal device at a transmit power configured for the second set.

It should be understood that the base station 800 according to this embodiment of this application may be corresponding to the base station in the downlink transmission method 300 according to the embodiments of this application, and the foregoing and other operations and/or functions of the units according to the base station 800 are intended to implement corresponding processes of the method 300 in FIG. 3 to FIG. 5. For brevity, details are not described herein again.

It should be noted that the sending unit 820 may be implemented by a transmitter, and the processing unit 810 may be implemented by a processor.

Figure 9:
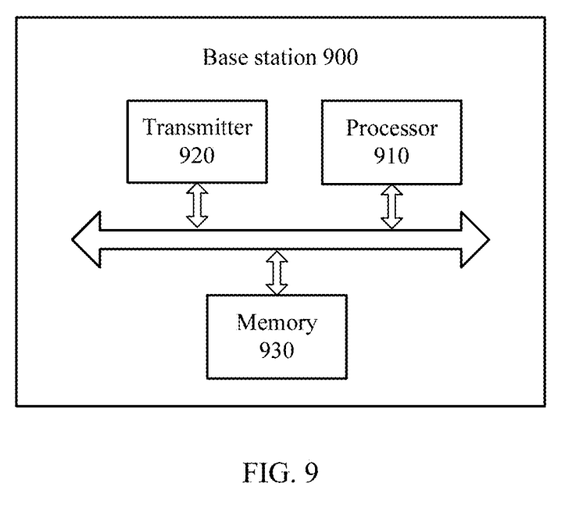
FIG. 9 is a schematic structural diagram of a base station according to another embodiment of this application.

FIG. 9 is a schematic structural diagram of a base station 900 according to another embodiment of this application. As shown in FIG. 9, the base station 900 includes a processor 910, a transmitter 920, and a memory 930, and the processor 910, the transmitter 920, and the memory 930 communicate with each other through internal connection paths to transfer a control signal and/or a data signal. The memory 930 is configured to store an instruction, and the processor 910 is configured to execute the instruction stored in the memory 930.

Specifically, the transmitter 920 is configured to implement a function of the sending unit 820 in the base station 800 shown in FIG. 8. The processor 910 is configured to implement a function of the processing unit 810 in the base station 800 shown in FIG. 8. For brevity, details are not described herein again.

It should be understood that the base station 900 according to this embodiment of this application may be corresponding to the base station in the downlink transmission method 300 according to the embodiments of this application and the base station 800 according to the embodiments of this application, and the foregoing and other operations and/or functions of the units in the base station 900 are intended to implement corresponding processes of the method 300 in FIG. 3 to FIG. 5. For brevity, details are not described herein again.

Figure 10:
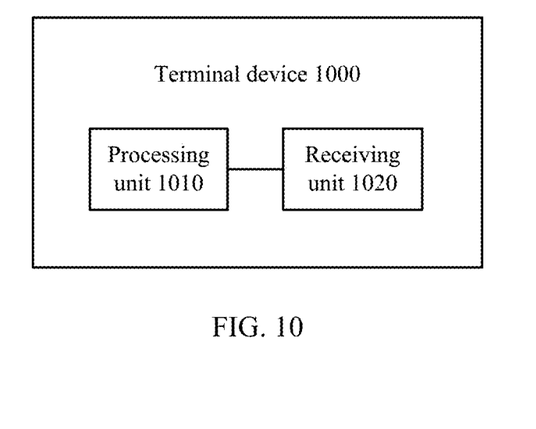
FIG. 10 is a schematic structural diagram of a terminal device according to an embodiment of this application.

FIG. 10 is a schematic structural diagram of a terminal device 1000 according to an embodiment of this application. As shown in FIG. 10, the terminal device 1000 includes a processing unit 1010 and a receiving unit 1020.

The processing unit 1010 is configured to determine at least two sets obtained through division of to-be-transmitted data by a base station, and determine power information of each of the at least two sets.

The receiving unit 1020 is configured to receive data in each set from the base station based on the power information of each set determined by the processing unit 1010.

In this embodiment of this application, the terminal device can receive the data in each set based on the power information of each set.

Optionally, the receiving unit 1020 is further configured to receive indication information from the base station, where the indication information indicates the at least two sets and the power information of each of the at least two sets. Correspondingly, the processing unit 1010 is specifically configured to determine the at least two sets and the power information of each set based on the indication information received by the receiving unit 1020.

Optionally, the power information of each set is a difference between the transmit power for each set and a preset power or a ratio of the transmit power for each set to a preset power.

In some embodiments, the receiving unit 1020 is further configured to receive subframe configuration information of a neighboring cell from the base station, where the subframe configuration information indicates that a self-contained subframe is used for transmission in the neighboring cell. Correspondingly, the processing unit 1020 is specifically configured to, based on the subframe configuration information received by the processing unit 1020, determine the at least two sets obtained through division of the to-be-transmitted data by the base station and the power information of each set, where at least one of the at least two sets is transmitted by using a time domain resource, in the self-contained subframe, used for uplink transmission in the neighboring cell, and a set of the at least two sets other than the at least one set is transmitted by using a time domain resource, in the self-contained subframe, used for downlink transmission in the neighboring cell.

In some embodiments, the at least two sets include a first set and a second set, where the first set and a reference signal occupy a same time-frequency resource, and the second set and the reference signal occupy different time-frequency resources. Correspondingly, the receiving unit 1020 is specifically configured to:

obtain a pattern of the reference signal;

on a time-frequency resource corresponding to the pattern of the reference signal, receive the reference signal through a first logical port, and receive data in the first set based on power information of the first set through a second logical port; and receive data in the second set based on power information of the second set.

It should be understood that the terminal device 1000 according to this embodiment of this application may be corresponding to the terminal device in the downlink transmission method 300 according to the embodiments of this application, and the foregoing and other operations and/or functions of the units in the terminal device 1000 are intended to implement corresponding processes of the method 300 in FIG. 3 to FIG. 5. For brevity, details are not described herein again.

It should be noted that the receiving unit 1020 may be implemented by a receiver, and the processing unit 1010 may be implemented by a processor.

Figure 11:
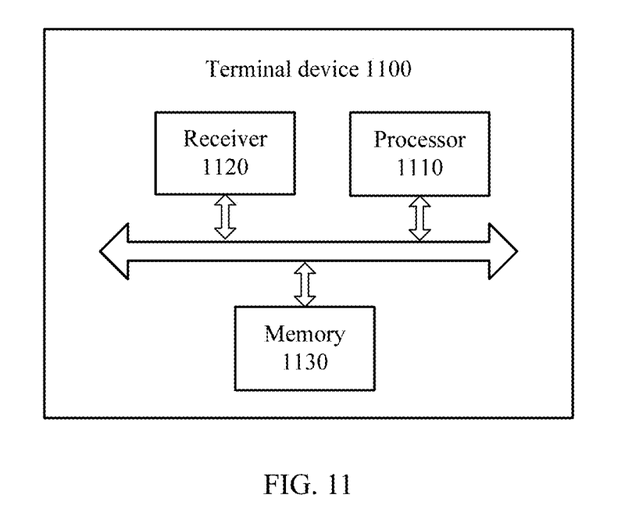
FIG. 11 is a schematic structural diagram of a terminal device according to another embodiment of this application.

FIG. 11 is a schematic structural diagram of a terminal device 1100 according to another embodiment of this application. As shown in FIG. 11, the terminal device 1100 includes a processor 1110, a receiver 1120, and a memory 1130, and the processor 1110, the receiver 1120, and the memory 1130 communicate with each other through internal connection paths to transfer a control signal and/or a data signal. The memory 1130 is configured to store an instruction, and the processor 1110 is configured to execute the instruction stored in the memory 1130.

Specifically, the receiver 1120 is configured to implement a function of the receiving unit 1020 in the terminal device 1000 shown in FIG. 10. The processor 1110 is configured to implement a function of the processing unit 1010 in the terminal device 1000 shown in FIG. 10. For brevity, details are not described herein again.

It should be understood that the terminal device 1100 according to this embodiment of this application may be corresponding to the terminal device in the downlink transmission method 300 according to the embodiments of this application and the terminal device 1000 according to the embodiments of this application, and the foregoing and other operations and/or functions of the units in the terminal device 1100 are intended to implement corresponding processes of the method 300 in FIG. 3 to FIG. 5. For brevity, details are not described herein again.

The memory in the foregoing embodiments may include a volatile memory, for example, a random-access memory (RAM). Alternatively, the memory may include a non-volatile memory, for example, a flash memory, a hard disk drive (HDD), or a solid-state drive (SSD). Alternatively, the memory may include a combination of the foregoing types of memories.

The processor in the foregoing embodiments may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) device, or any combination thereof.

A person of ordinary skill in the art may be aware that the steps and algorithm steps in the examples described with reference to the embodiments disclosed herein may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the embodiments of this application.

It may be understood by a person skilled in the art that, for the purpose of convenient and brief description, for a detailed working process of the foregoing system, apparatus, or unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely division by logical function and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electronical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of software functional units and sold or used as an independent product, the functions may be stored in a computer-readable storage medium. Based on such an understanding, the technical solutions of the embodiments of this application essentially, or the part contributing to the current system, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the embodiments of this application shall be subject to the protection scope of the claims.

What is claimed is:

1. A method, comprising:
   determining, by a base station, that a self-contained subframe is used for transmission in a neighboring cell;
   dividing, by the base station, to-be-transmitted data into at least two sets, at least one of the at least two sets being transmitted in a first time domain resource, in the self-contained subframe, used for uplink transmission in the neighboring cell, and another set of the at least two sets, other than the at least one set, being transmitted in a second time domain resource, in the self-contained subframe, used for downlink transmission in the neighboring cell;
   configuring, by the base station, a transmit power for each set of the at least two sets;
   sending, by the base station, indication information to a terminal device, the indication information indicating the at least two sets and downlink power information of each of the at least two sets; and
   sending, by the base station, data in each set to the terminal device at the transmit power configured for the each set.

2. The method according to claim 1, wherein the downlink power information of the each set is a difference between the transmit power for the each set and a preset power or a ratio of the transmit power for the each set to the preset power.

3. The method according to claim 1, wherein before the sending, by the base station, the data in each set to the terminal device at the transmit power configured for the each set, the method further comprises:
   sending, by the base station, subframe configuration information of the neighboring cell to the terminal device, the subframe configuration information indicating that the self-contained subframe is used for transmission in the neighboring cell.

4. The method according to claim 1, wherein the at least two sets comprise a first set and a second set, the first set and a reference signal occupy a same time-frequency resource, and the second set and the reference signal occupy different time-frequency resources; and
   the sending, by the base station, the data in each set to the terminal device at the transmit power configured for the each set comprises:
      in a spatial multiplexing manner on a time-frequency resource corresponding to a pattern of the reference signal, sending, by the base station, the reference signal to the terminal device through a first logical port, and sending the data in the first set to the terminal device through a second logical port at a first transmit power configured for the first set; and
      sending, by the base station, the data in the second set to the terminal device at a second transmit power configured for the second set.

5. A method, comprising:
   receiving, by a terminal device, subframe configuration information of a neighboring cell from a base station, the subframe configuration information indicating that a self-contained subframe is used for transmission in the neighboring cell;
   receiving, by the terminal device from the base station, indication information indicating at least two sets obtained through division of to-be-transmitted data by the base station and downlink power information of each set of the at least two sets;
   based on the subframe configuration information, determining, by the terminal device, the at least two sets obtained through division of the to-be-transmitted data by the base station and the downlink power information of the each set, at least one of the at least two sets being transmitted in a first time domain resource, in the self-contained subframe, used for uplink transmission in the neighboring cell, and another set of the at least two sets, other than the at least one set, being transmitted in a second time domain resource, in the self-contained subframe, used for downlink transmission in the neighboring cell; and
   receiving, by the terminal device, data in each set from the base station based on the downlink power information of the each set.

6. The method according to claim 5, further comprising:
   determining, by the terminal device, the at least two sets and the downlink power information of the each set based on the indication information.

7. The method according to claim 5, wherein the downlink power information of the each set is a difference between a transmit power for the each set and a preset power or a ratio of the transmit power for the each set to the preset power.

8. The method according to claim 5, wherein the at least two sets comprise a first set and a second set, the first set and a reference signal occupy a same time-frequency resource, and the second set and the reference signal occupy different time-frequency resources; and
   the receiving, by the terminal device, the data in each set from the base station based on the downlink power information of the each set comprises:
      obtaining, by the terminal device, a pattern of the reference signal;
      receiving, by the terminal device, the reference signal on a time-frequency resource corresponding to the pattern of the reference signal through a first logical port, and receiving the data in the first set based on the downlink power information of the first set through a second logical port; and receiving, by the terminal device, the data in the second set based on the downlink power information of the second set.

9. A terminal device, comprising:
a receiver, configured to:
receive, from a base station, subframe configuration information of a neighboring cell, wherein the subframe configuration information indicates that a self-contained subframe is used for transmission in the neighboring cell; and
receive indication information from the base station, wherein the indication information indicates at least two sets obtained through division of to-be-transmitted data by the base station, and downlink power information of each of the at least two sets; and
at least one processor, configured to:
determine the at least two sets and the downlink power information of each set of the at least two sets; and
based on the subframe configuration information received by the receiver, determine the at least two sets obtained through division of the to-be-transmitted data by the base station and the downlink power information of the each set, wherein at least one of the at least two sets is transmitted by using a first time domain resource, in the self-contained subframe, used for uplink transmission in the neighboring cell, and another set of the at least two sets other than the at least one set is transmitted by using a second time domain resource, in the self-contained subframe, used for downlink transmission in the neighboring cell;
the receiver further configured to receive data in each set from the base station based on the downlink power information of the each set determined by the at least one processor.

10. The terminal device according to claim 9, wherein:
the at least one processor is configured to determine the at least two sets and the downlink power information of the each set based on the indication information received by the receiver.

11. The terminal device according to claim 9, wherein the downlink power information of the each set is a difference between a transmit power for the each set and a preset power or a ratio of the transmit power for the each set to the preset power.

12. The terminal device according to claim 9, wherein the at least two sets comprise a first set and a second set, the first set and a reference signal occupy a same time-frequency resource, and the second set and the reference signal occupy different time-frequency resources; and
the receiver is configured to:
obtain a pattern of the reference signal;
receive the reference signal on a time-frequency resource corresponding to the pattern of the reference signal through a first logical port, and receive the data in the first set based on the downlink power information of the first set through a second logical port; and
receive the data in the second set based on the downlink power information of the second set.

13. A base station, comprising:
at least one processor, configured to:
determine that a self-contained subframe is used for transmission in a neighboring cell;
divide to-be-transmitted data into at least two sets, at least one of the at least two sets being transmitted in a first time domain resource, in the self-contained subframe, used for uplink transmission in the neighboring cell, and another set of the at least two sets, other than the at least one set, being transmitted in a second time domain resource, in the self-contained subframe, used for downlink transmission in the neighboring cell; and
configure a transmit power for each set of the at least two sets; and
a transmitter, configured to:
send indication information to a terminal device, the indication information indicating the at least two sets and downlink power information of each of the at least two sets; and
send data in each set to the terminal device at the transmit power configured for the each set.

14. The base station according to claim 13, wherein the downlink power information of the each set is a difference between the transmit power for the each set and a preset power or a ratio of the transmit power for the each set to the preset power.

15. The base station according to claim 13, wherein the transmitter is configured to send subframe configuration information of the neighboring cell to the terminal device, the subframe configuration information indicating that the self-contained subframe is used for transmission in the neighboring cell.

16. The base station according to claim 13, wherein the at least two sets comprise a first set and a second set, the first set and a reference signal occupy a same time-frequency resource, and the second set and the reference signal occupy different time-frequency resources; and
wherein the transmitter configured to send the data in each set to the terminal device at the transmit power configured for the each set comprises the transmitter configured to:
in a spatial multiplexing manner on a time-frequency resource corresponding to a pattern of the reference signal, send the reference signal to the terminal device through a first logical port, and send the data in the first set to the terminal device through a second logical port at a first transmit power configured for the first set; and
send the data in the second set to the terminal device at a second transmit power configured for the second set.

* * * * *